United States Patent
Homer

(10) Patent No.: US 6,775,008 B2
(45) Date of Patent: Aug. 10, 2004

(54) OPTO-ELECTRONIC SCALE READING APPARATUS

(75) Inventor: Michael Homer, Dursley (GB)

(73) Assignee: Renishaw PLC, Gloucestershire (GB)

( * ) Notice: Subject to any disclaimer, the term of this patent is extended or adjusted under 35 U.S.C. 154(b) by 473 days.

(21) Appl. No.: 09/958,688

(22) PCT Filed: Feb. 23, 2001

(86) PCT No.: PCT/GB01/00771
§ 371 (c)(1),
(2), (4) Date: Oct. 12, 2001

(87) PCT Pub. No.: WO01/63215
PCT Pub. Date: Aug. 30, 2001

(65) Prior Publication Data
US 2003/0002039 A1 Jan. 2, 2003

(30) Foreign Application Priority Data
Feb. 23, 2000 (GB) .............................................. 0004120

(51) Int. Cl.[7] .......................... G01B 11/02; G01B 9/02; G01J 3/50; G01D 5/34; H01J 3/14
(52) U.S. Cl. ...................... 356/499; 356/497; 356/494; 356/500; 356/512; 356/521; 250/226; 250/231.16; 250/237 G
(58) Field of Search ................................ 356/499, 497, 356/494, 500, 512, 521; 250/226, 231.16, 237 G

(56) References Cited

U.S. PATENT DOCUMENTS

| | | | | |
|---|---|---|---|---|
| 4,975,571 A | * | 12/1990 | McMurtry et al. | 250/231.16 |
| 5,033,817 A | * | 7/1991 | Stephens | 359/569 |
| 5,064,290 A | * | 11/1991 | McMurtry et al. | 356/499 |
| 5,184,014 A | * | 2/1993 | Stephens et al. | 250/237 G |
| 5,302,820 A | * | 4/1994 | Henshaw et al. | 250/231.16 |
| 5,355,220 A | | 10/1994 | Kobayashi et al. | |
| 5,539,519 A | | 7/1996 | Takagi et al. | |
| 5,726,442 A | * | 3/1998 | Henshaw | 250/226 |
| 5,861,953 A | * | 1/1999 | Henshaw | 356/499 |

FOREIGN PATENT DOCUMENTS

| | | |
|---|---|---|
| DE | 39 38 935 A1 | 5/1991 |
| DE | 42 26 683 A1 | 2/1993 |
| DE | 199 18 101 A1 | 10/2000 |
| EP | 0 207 121 B1 | 1/1987 |
| EP | 0 543 513 B1 | 5/1993 |
| EP | 0 577 090 A2 | 1/1994 |
| GB | 1 311 275 | 3/1973 |
| GB | 1 474 049 | 5/1977 |
| GB | 0 387 520 | 5/1993 |
| WO | WO 89/05964 | 6/1989 |
| WO | WO 96/18868 | 6/1996 |

OTHER PUBLICATIONS

"Optical Encoder Based On The Lau Effect" by Daniel Crespo et al., Society of Photo–Optical Instrumentation Engineers, Mar. 2000, pp. 817–824.

"Analysis Of The Fresnal Field Of A Double Diffraction System In The Case Of Two Amplitude Diffraction Gratings Under Partially Coherent Illumination" by Artur Olszak et al., Society of Photo–Optical Instrumentation Engineers, Aug. 1997, pp. 2149–2157.

* cited by examiner

Primary Examiner—Frank G. Font
Assistant Examiner—Khaled Brown
(74) Attorney, Agent, or Firm—Oliff & Berridge PLC

(57) ABSTRACT

A scale (10) is illuminated by a light source (18). After interaction with an index grating (12), fringes (F) are formed in a Talbot plane and analyzed by an analyzer grating (14). To decrease the sensitivity to changes in the ride height of the index grating above the scale, the light source is restricted to a small but finite size, and positioned so that it subtends a small angle Ø at the analyzer grating (or, if a collimating lens (24) is used, positioned so that it subtends a small angle Ø at the lens). The size of the light source should preferably be smaller than a predetermined value such that the extent of a geometric fringe visibility envelope exceeds the extent of a Talbot fringe visibility envelope.

17 Claims, 3 Drawing Sheets

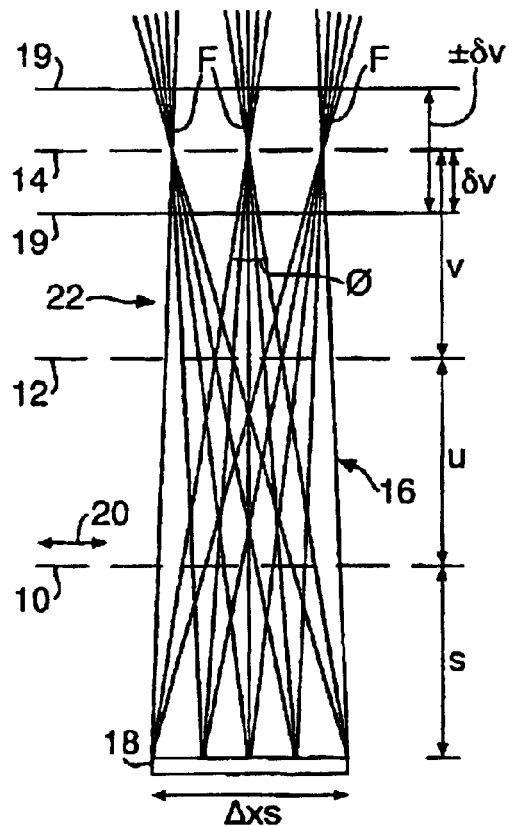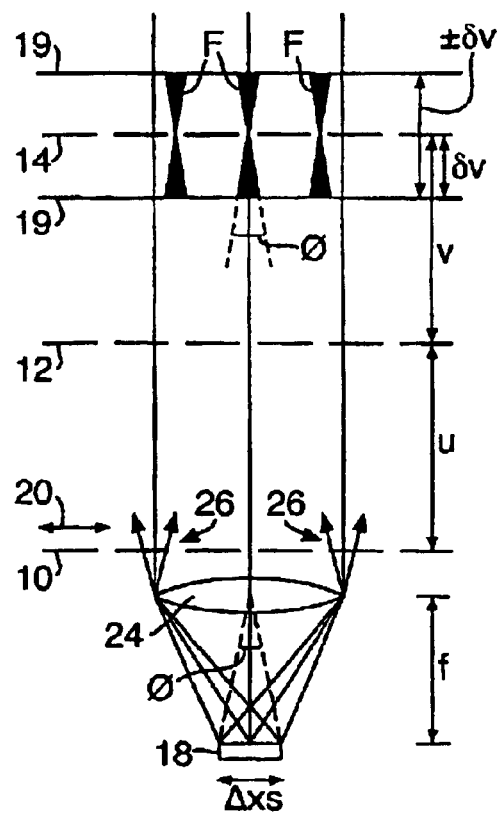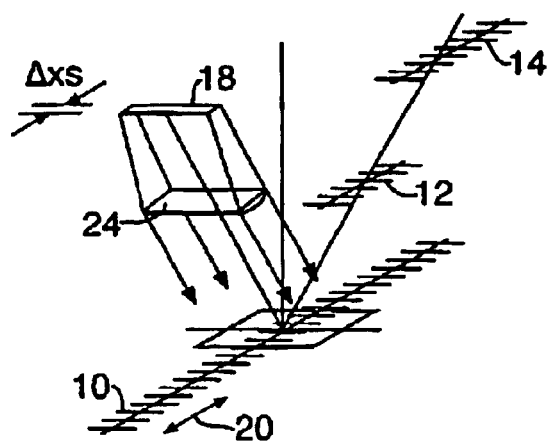

OPTO-ELECTRONIC SCALE READING APPARATUS

FIELD OF THE INVENTION

This invention relates to an opto-electronic scale reading apparatus. It may be used in an encoder for measuring linear or angular displacement of one member relative to another.

DESCRIPTION OF PRIOR ART

A known type of such scale reading apparatus is described in European Patent Application No. 207121. Periodic marks on a scale are illuminated and act as a periodic pattern of light sources. A readhead comprises, in succession from the scale, an index grating, an analyser grating and a sensor assembly. Alternatively, the analyser grating and the sensor can be integrated, as described in European Patent Application No. 543513, giving what may be termed an "electrograting".

The devices described in those patent applications rely on diffraction which takes place in the readhead, not at the scale. In particular, use is made of the diffraction phenomenon known as "self-imaging" or "Fourier imaging" of periodic transmission masks. Fringes are formed at the level of the analyser grating, by Fourier imaging of the index grating. When he scale and readhead move relative to each other, in the longitudinal direction of the scale, these fringes also move. Detection of the fringe movement provides a measure of the relative displacement of the scale and the readhead.

In practice, such devices are sensitive to the spacing or "ride height" between the scale and the readhead. When the scale and readhead are installed on a machine, it is necessary to ensure that the readhead will remain at an appropriate ride height throughout the length of its travel along the scale.

Our International Patent Application No. WO96/18868 addresses this problem, and decreases the ride height sensitivity, but at the expense of an overall decrease in the contrast (and therefore visibility) in the resulting fringes.

SUMMARY OF THE INVENTION

The present invention is based upon new research by the inventor into the mechanism of operation of readheads of the type described in EP 207121, and consequent insights into the causes of the ride height sensitivity.

The fringe visibility is found to depend both upon a Talbot fringe visibility envelope, and upon a geometric fringe visibility envelope which depends upon the size of the light source.

According to one aspect of the invention, the light source is restricted to a small but finite size, and positioned so that it subtends a small angle at the analyser grating (or, if a collimating lens is used, positioned so that it subtends a small angle at the lens). The size of the light source should preferably be smaller than a predetermined value such that the extent of the geometric fringe visibility envelope exceeds the extent of the Talbot fringe visibility envelope.

According to a further aspect of the present invention, the scale is illuminated with collimated light. This may be done by placing a collimating lens between the illuminating source and the scale. As a result of the collimated illumination, the fringes have a constant pitch rather than diverging.

BRIEF DESCRIPTION OF THE DRAWINGS

Preferred embodiments of the invention will now be described by way of example, with reference to the accompanying drawings, in which:

FIGS. 3 and 4 are schematic representations of two different scale and readhead arrangements according to the present invention;

FIG. 5 is a diagrammatic isometric view of a further scale and readhead according to the invention;

DESCRIPTION OF PREFERRED EMBODIMENTS

The inventor's research shows that the ride height sensitivity in the known apparatus according to EP 207121 results from a combination of several causes.

One cause is that the fringes are formed in so-called Talbot planes, defined by (amongst other things) the spacing between the scale and the index grating. It is necessary to hold the analyser in a plane substantially in accordance with certain formulae, so that a Talbot plane of high fringe visibility coincides sufficiently closely with the analyser. As the ride height varies from the ideal value, then the spacing between the scale and the index grating also varies. The Talbot plane then no longer coincides exactly with the analyser, so that the fringe contrast (and therefore visibility) at the analyser decreases. It is possible to derive an expression and draw a graph describing the envelope of the fringe visibility against the mismatch between the analyser and the Talbot plane. This is discussed in more detail below, in relation to FIGS. 6 and 7 and will be referred to as the Talbot fringe visibility envelope.

Two further causes of the ride height sensitivity will now be explained with reference to FIGS. 1 and 2 of the accompanying drawings. It should be appreciated that these Figures have been drawn to emphasise the problems to be discussed. They are highly diagrammatic and not to scale.

Figure 1:
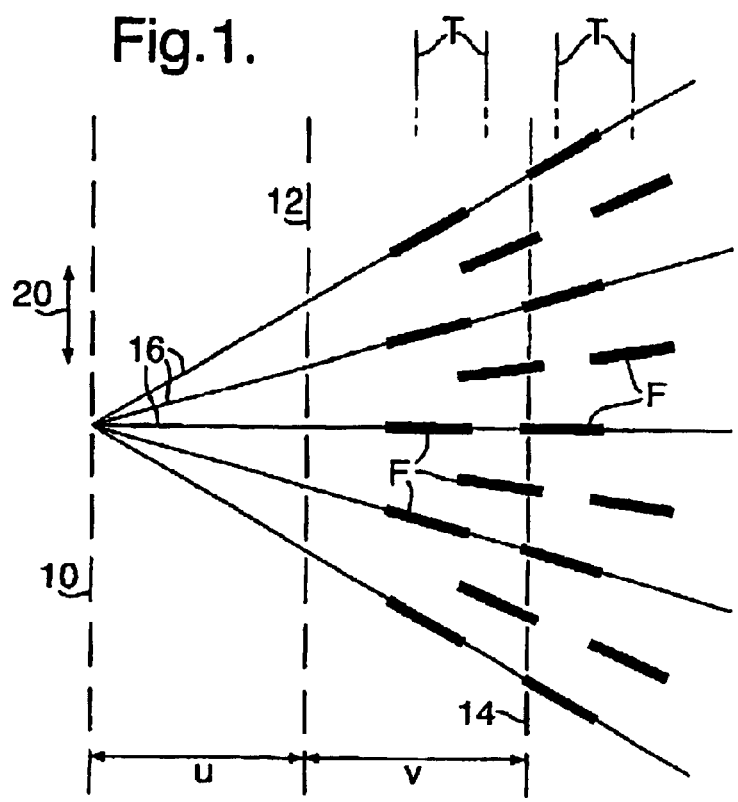
FIGS. 1 and 2 are schematic representations of a scale and readhead, illustrating the problems underlying the present invention.

FIG. 1 shows an elongate, periodic scale 10, an index grating 12 and an analyser grating 14. In practice, the gratings 12 and 14 would be provided within a readhead, movable along the length of the scale 10. The spacing v between the gratings 12,14 would therefore be fixed, while the spacing u between the scale 10 and the index grating 12 would vary, depending on the ride height of the readhead above the scale at different parts of its travel. The pitches of the scale 10, the index grating 12 and the analyser grating 14, and the values of u and v are chosen in accordance with the formulae set out in EP 207121. It will be appreciated that, in practice, the pitches of the scale 10, index grating 12 and analyser grating 14 (compared to the values of u and v) will be rather smaller than shown. Sensors for detecting the light have not been shown in FIG. 1, but may be integrated with the analyser grating 14 as discussed in EP 543513, forming an electrograting. The gratings may be phase gratings or amplitude gratings. The scale may be transmissive or reflective.

FIG. 1 shows a series of hypothetical geometric rays 16 diverging from a single light-transmitting or light-reflecting point on the scale 10. It also shows several series of fringes F in the image space behind the index grating 12, in different Talbot planes T. In practice, the values of the pitches of the scale and the gratings, and the values of u and v, may be selected such that the analyser grating 14 is placed as shown, to react to fringes from two adjacent Talbot planes. The analyser grating thereby sees a doubling of the fringe pitch, and the readhead has double the resolution.

It will be seen from FIG. 1 that, considering just one light-transmitting or light-reflecting point on the scale 10, the fringes F diverge at higher Talbot planes. In practice, with an uncollimated light source, the fringes will be formed as a result of a combination of light from numerous points on the scale. They will still diverge, but not exactly as shown in FIG. 1. The result is that, if the ride height of the readhead over the scale varies, changing the value of u, then the spacing of the fringes will no longer match the pitch of the analyser grating 14. Consequently, the signal produced by the sensors will be significantly reduced. If the ride height varies too much, the signal will be lost altogether. This is particularly a problem with relatively large electrogratings, such as are required for increased immunity to dirt on the scale. The fringes become increasingly dephased, relative to the pitch of the electrograting, at larger lateral distances from the centre of the electrograting.

Figure 2:
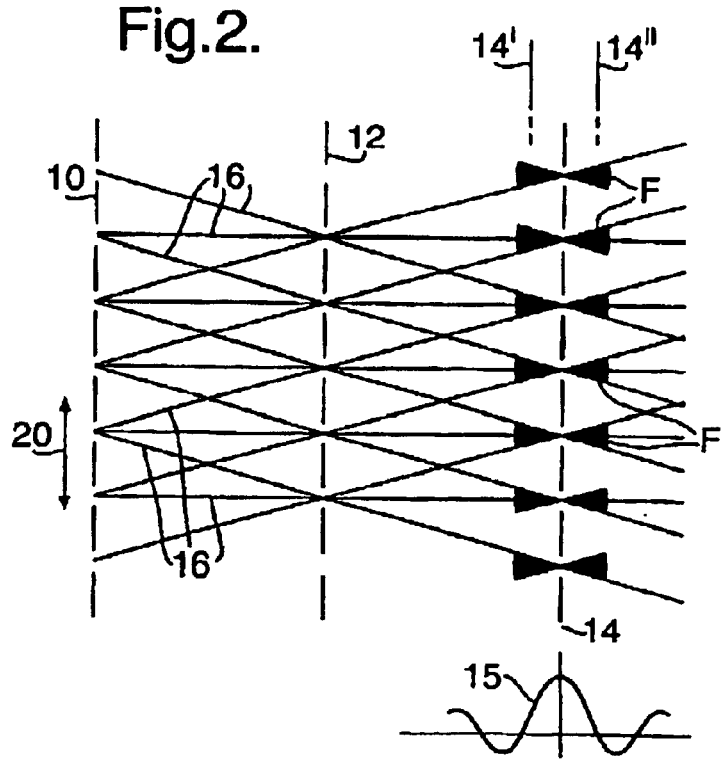

FIG. 2 has been drawn to illustrate a third cause of ride height sensitivity. Here, hypothetical geometric rays 16 have been drawn from numerous light-transmitting or light-reflecting points on the scale 10. The range of angles of these rays depends upon the finite size of the light source which illuminates the scale. For simplicity, only one set of fringes F in one Talbot plane has been drawn, and the analyser grating 14 is shown in this Talbot plane. In this Talbot plane, the fringes produced have high contrast, and a good signal will be produced by the readhead. However, as a result of the range of angles of the rays, it can be seen that each fringe fans out away from the Talbot plane. This results in each fringe being blurred (losing contrast) in planes away from the nominal Talbot plane (where maximum contrast occurs). Consequently, if the grating 14 were moved to the plane 14' or 14", much of the fringe visibility would be lost.

In real life, while the analyser grating 14 is in a fixed position relative to the index grating 12, changes in the ride height of the readhead cause the plane of the fringes to move, such that the grating 14 may be in a lower contrast, fanned-out region of the fringes. As previously, if the ride height changes too much, the signal may be lost altogether.

FIG. 2 includes a curve 15 which illustrates this third problem. This is the envelope of the fringe visibility (resulting from these geometric considerations) against the position of the analyser 14 relative to its ideal position. It will be referred to below as the geometric fringe visibility envelope.

In a practical readhead, the inventor has discovered that the above three effects all occur in combination. If the source is uncollimated, the fringes tend to diverge as shown in FIG. 1, even though they are being produced from more than one light-transmitting or light-reflecting point on the scale. (Indeed, if a lens is used which has a shorter focal length than is required for collimation, the fringes may even converge.) Each of these fringes is also subject to loss of contrast caused by fanning out as shown in FIG. 2, as described by the geometric fringe visibility envelope 15. And in addition, each is subject to the Talbot fringe visibility envelope.

FIG. 3 illustrates a scale and readhead without a collimating lens for the illuminating light. It comprises a scale 10, index grating 12 and analyser grating 14, and these may be constructed in the same way as already mentioned for FIGS. 1 and 2. For example, the index grating 12 may be a phase grating or an amplitude grating, and the analyser grating 14 may be integrated with a sensor array as described in EP543513 Again as in FIGS. 1 and 2, the pitches and spacing of the various components are not drawn to scale. Whilst a transmissive scale 10 has been shown for convenience, it will be appreciated that a reflective scale may be used instead, and the following description is equally applicable to that.

The index and analyser gratings 12,14 and the sensor arrangement are provided within a readhead. The scale 10 and the readhead move relative to each other in the direction indicated by the arrows 20.

Also within the readhead is a light source 18. This has a width $\Delta xs$, and is spaced a distance s from the scale 10. As in FIG. 1, the letters u and v denote the respective spacings between the scale 10, the index grating 12 and the analyser grating 14.

FIG. 3 also shows hypothetical geometric rays 16 extending from the source 18 through the analyser grating 14. As in FIG. 2, the resulting fringes F in the vicinity of the analyser grating 14 fan out and lose contrast if there is any deviation of the grating 14 from the ideal position shown. This could happen as a result of changes in the ride height of the readhead above the scale 10. FIG. 3 shows a region $\pm\delta v$ (between tolerance lines 19) within which this fanning out is acceptable, and still produces good, easily detectable fringes (i.e within the geometric fringe visibility envelope 15).

In order to maximise the value of $\delta v$, and thereby maximise the permissible ride height variation of the readhead over the scale, the size of the source 18 is chosen as follows. In FIG. 3, $\varphi$ denotes the angle subtended at a point on the analyser grating 14 by the width $\Delta xs$ of the source 18. It can be seen that $$\varphi = \frac{\Delta xs}{u+v+s} \quad (1)$$

For good fringe visibility (i.e. good fringe contrast) it is necessary that $\delta v$ should be in a region where the fringes F remain distinct from each other. In other words, $\delta v$ cannot be so large that the tolerance lines 19 extend into a region 22 where the fringes merge into each other.

At the point where the fringes merge into each other (as denoted by the merging of the fanned rays 16) the angle $\varphi$ would be equal to $$\frac{P}{\delta v}$$

(where P is the pitch of the analyser grating 14 and equals the pitch of the fringes in the chosen Talbot plane). This implies that for good fringe visibility $$\delta v < \frac{P}{\varphi} \quad (2)$$

Combining relations (1) and (2), $$\Delta xs < \frac{P(u+v+s)}{\delta v} \quad (3)$$

Therefore, the value of $\Delta xs$ must be chosen to be so small as to produce the desired value of $\delta v$ from relation (3). In particular as discussed in more detail below, $\Delta xs$ should be sufficiently small that the size of the geometric fringe visibility envelope (which is related to $\delta v$) exceeds that of the Talbot fringe visibility envelope. However, $\Delta xs$ should not be so small that the readhead is susceptible to high frequency noise components and dirt on the scale.

It is also advantageous to ensure that the light is sufficiently collimated so that the fringes do not diverge so much that fringe visibility is reduced from this cause before the Talbot fringe visibility envelope is exceeded.

FIG. 4 shows another embodiment of the invention. It may share many of the features mentioned for FIG. 3, and the same reference numerals have been used where appropriate. However, the readhead in FIG. 4 includes a lens 24 between the source 18 and the scale 10. The lens has a focal length f, and is arranged to collimate the light from the light source 18. However, it will be appreciated that complete collimation is not possible, because of the finite size of the light source 18. This is indicated by rays 26.

FIG. 4 also shows fanned out fringes F (as in FIG. 2), between lines of tolerance 19 defining an acceptable region ±δv, within which the fringes have acceptable contrast and visibility. This fanning out of the fringes occurs in the same way as in FIG. 2. The fringes do not diverge as in FIG. 1, because of the collimated light produced by the lens 24, but the geometric fringe visibility envelope 15 of FIG. 2 still exists because the collimation cannot be complete.

FIG. 4 illustrates the angle φ subtended at the level of the lens 24 by the finite width Δxs of the source 18. This angle φ governs the degree of non-collimation of the light, and consequently the degree of fanning out of the fringes F, as also illustrated in FIG. 4. It will be seen that $$\phi = \frac{\Delta xs}{f} \qquad (4)$$

For good fringe contrast and visibility, relation (2) holds for this embodiment, for the same reasons as in FIG. 3. Combining relations (2) and (4), $$\Delta xs < \frac{P \cdot f}{\delta v} \qquad (5)$$

Therefore, in the case of FIG. 4, the value of Δxs must be chosen to be so small as to produce the desired value of δv from relation (5).

Figure 6:
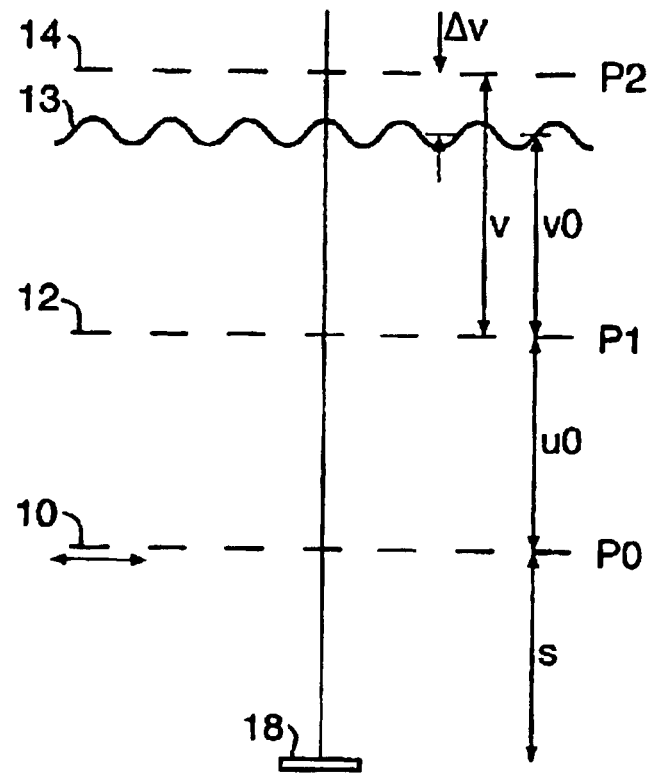
FIG. 6 is another diagrammatic representation of a scale and readhead.
Figure 7:
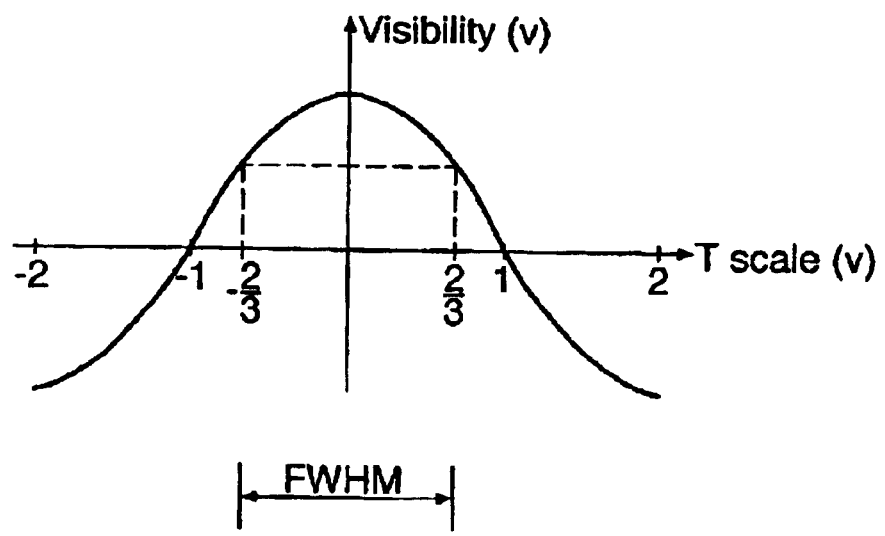
FIG. 7 shows a Talbot fringe visibility envelope of the system in FIG. 6.

A more rigorous treatment of the conditions for good fringe visibility will now be presented, referring to FIGS. 6 and 7. We first derive an expression for the Talbot fringe visibility envelope.

FIG. 6 shows a system with a light source 18, scale 10 and index grating 12, as previously. Fringes are produced in a nominal Talbot plane 13. The system parameters are defined by P0=period of the scale 10
P1=period of the index grating 12
u0=spacing between scale 10 and grating 12
s=effective distance from the source 18 to the scale 10. Note that if a lens is interposed between the source and the scale, this effective distance is the distance from the scale to the position of the virtual source (i.e. infinity if the source is in the focal plane of the lens so that the light is well collimated).

The following quantities can be derived:

$\alpha 0 = \frac{P1}{2P0 - P1}$ (magnification factor)

$v0 = \alpha 0 \cdot u0$ (distance from grating 12 to the nominal fringe plane 13)

$P2 = \alpha 0 \cdot P0$ (period of the fringe at the nominal fringe plane 13)

Now let v be the distance from the grating 12 to the analyser 14. So (v−v0) is the distance Δv by which the analyser is mispositioned relative to the ideal nominal Talbot plane 13.

We define the following:

$$Fscale(v) = \left(\frac{1}{s + u0 + v0} + \frac{1}{v - v0}\right)^{-1} \qquad (6)$$

$$Tscale(v) = \left(\frac{-\alpha 0 \cdot s}{s + u0 + v0}\right) \cdot \frac{2 Fscale(v) \cdot \lambda}{P2^2} \qquad (7)$$

where λ is the wavelength of the light.

In the case of well collimated light (s tends to infinity) these reduce to:

$$Fscale(v) = v - v0 \qquad (8)$$

$$Tscale(v) = \frac{-2 \cdot \alpha 0 \cdot (v - v0) \cdot \lambda}{P2^2} \qquad (9)$$

The Talbot fringe visibility envelope is illustrated in FIG. 7. This is the visibility of the fringes (based upon a consideration of the Fourier self-imaging mechanism by which they are produced) and is in terms of Tscale(v). This Talbot fringe visibility envelope is given by $$\text{Visibility}(v) \propto \cos\left(\frac{2\pi Tscale(v)}{4}\right) \qquad (10)$$

The Talbot fringe visibility goes to zero when Tscale(v)= ±1. From equation (9), for collimated light, this is when $$\Delta v = v - v0 = \pm \frac{P2^2}{2 \cdot \alpha 0 \cdot \lambda} \qquad (11)$$

The full width half maximum (FWHM) value of the Talbot fringe visibility envelope occurs when the visibility drops to 50% of the peak value. Since the envelope has a cosine form, this happens at Tscale(v)=±⅔. For collimated light, this is when Δv is two-thirds of the value in equation (11), i.e.

$$\Delta v = \pm \frac{P2^2}{3 \cdot \alpha 0 \cdot \lambda} \qquad (12)$$

Corresponding expressions can be derived for non-collimated or partially collimated light.

In addition to the localisation of the fringes according to equations (10) to (12), the extent of the fringes will also be limited by the geometric fringe visibility envelope (15 in FIG. 2), which is related to the angular extent φ of the apparent light source, as subtended at the nominal fringe plane. See the discussion above of FIGS. 3 and 4. We will now give an expression for this geometric fringe visibility envelope which is more rigorous than given in relations (1) to (5) above.

This geometric visibility envelope is derived as the Fourier transform of the intensity distribution of the light source. It should be appropriately scaled to take account of (amongst other things) the apparent source size and distances s, u0, v0. In the following, therefore, ΔXS is the apparent source size, and is related to the real source size Δxs by its position relative to the lens, and the focal length f of the lens.

If the source has a rectangular intensity distribution function, the geometric visibility envelope 15 will be a sinc function:

$$\frac{\sin(\pi a \Delta v)}{\pi a \Delta v} \quad (13)$$

$$\text{where } a = \frac{\Delta XS}{P2(s + u0 + v0)} \quad (14)$$

The visibility according to this function drops to zero when $$\Delta v = \pm \frac{P2(s + u0 + v0)}{\Delta XS} \quad (15)$$

The full width half maximum (FWHM) value of the geometric visibility envelope occurs at $$\Delta v = \pm 0.6033 \frac{P2(s + u0 + v0)}{\Delta XS} \quad (16)$$

Of course, in the case of well collimated light, s and $\Delta XS$ both tend to infinity, and u0 and v0 can be ignored. Furthermore, lens aberrations can extend the apparent source size, and should preferably also be taken into account. However, it is a straightforward matter to select an appropriate real source size $\Delta xs$ in order to satisfy relations (15) and (16) for any desired $\Delta v$.

If the source intensity distribution is not rectangular, e.g. if it is Gaussian, then an appropriate expression equivalent to (16) can be derived.

In practical embodiments of the present invention, we select the source size $\Delta xs$ such that the extent of the geometric fringe visibility envelope exceeds that of the Talbot fringe visibility envelope. This is because, in prior art scales and readheads built according to EP 207121, the inventor has discovered that the apparent source size is so large that the geometric fringe visibility envelope is relatively small, compared to the Talbot envelope. The overall fringe visibility in these prior art devices is therefore limited by the geometric envelope, and the maximum visibility predicted by the theory of Fourier self imaging is not obtained.

In practical embodiments, therefore, the source size is selected in accordance with equations (12) and (16) such that:

$$0.6033 \frac{P2(s + u0 + v0)}{\Delta XS} > \frac{P2^2}{3 \cdot \alpha 0 \cdot \lambda} \text{ or} \quad (17)$$

$$\varphi < 1.8 \frac{\alpha 0 \cdot \lambda}{P2} \text{ or} \quad (18)$$

$$\varphi < 1.8 \frac{\lambda}{P0} \quad (19)$$

Again, if the source intensity distribution is not rectangular, then appropriate expressions equivalent to (17) to (19) can be derived.

The overall fringe visibility results from a convolution of the geometric and Talbot visibility envelopes. Consequently, there is advantage in making the extent of the geometric envelope at least one and a quarter times that of the Talbot envelope, in order to to reduce the effect of the geometric envelope.

At first sight, in order to eliminate the fanning out effect of FIG. 2, a point source would seem to be ideal, in order that the angle $\phi$ is zero and there is no effect from a geometric envelope. However, the source size and angle $\phi$ need to be large enough so that high frequency noise and harmonics are cancelled, leaving only fringes at the fundamental period. Having the angle $\phi$ large enough also gives immunity to dirt on the scale. There is a trade-off between elimination of the fanning out effect and cancellation of noise/dirt immunity.

Consequently, it is desirable that the extent of the geometric fringe visibility envelope is less than four times (and preferably less than three times or twice) the extent of the Talbot fringe visibility envelope.

The following examples compare known devices with embodiments of the present invention.

EXAMPLE 1

A known scale and readhead (using a scale with P0=0.02 mm) has the following parameters:

P2=0.026 mm $\alpha 0$=1.3

$\lambda$=0.88×10$^{-3}$ mm

Therefore, from equation (12), the FWHM size of the Talbot fringe visibility envelope is $\Delta v$=±0.197 mm This known device has a light source in the form of an infra-red LED, incorporating a lens giving partial collimation, which also introduces aberrations. Taking both the partial collimation and the aberrations into account, the apparent or effective source size is measured as 1.5 mm and the apparent distance s from the source to the scale is 11.1 mm. The distances u0 and v0 are 2.6 mm and 3.4 mm respectively.

Therefore, from equation (16) the FWHM size of the geometric fringe visibility envelope is $\Delta v$=±0.179 mm This is less than for the Talbot envelope, so the geometric fringe visibility envelope dominates the overall fringe visibility.

EXAMPLE 2

In an embodiment of the present invention, the scale and readhead of Example 1 is modified by reducing the size of the source so that its apparent size is 1 mm. The Talbot fringe visibility envelope is unchanged, but the FWHM size of the geometric envelope increases to $\Delta v$=±0.268 mm. This is greater than the FWHM size of the Talbot envelope, so the Talbot envelope is now more dominant in the overall fringe visibility.

EXAMPLE 3

A further known scale and readhead (using a scale with P0=0.04 mm) has the following parameters P2=0.026 mm $\alpha 0$=0.65

$\lambda$=0.88×10$^{-3}$ mm

Therefore, from equation (12) the FWHM size of the Talbot fringe visibility envelope is $\Delta v$=±0.394 mm This known device uses the same source and lens arrangement as in Example 1, with the same apparent source size $\Delta XS$ and distance s. The distances u0 and v0 are 3.64 mm and 2.36 mm respectively.

Therefore, from equation (16) the FWHM size of the geometric fringe visibility envelope is the same as in Example 1:

$\Delta v$=±0.179 mm

This is less than for the Talbot envelope, so once again the geometric envelope dominates the overall fringe visibility.

EXAMPLE 4

In a further embodiment of the invention, the scale and readhead of Example 3 is modified by reducing the size of the source so that its apparent size is 0.5 mm. The Talbot fringe visibility envelope is unchanged, but the FWHM size of the geometric envelope increases to $\Delta v = \pm 0.536$ mm. This is greater than the Talbot envelope, so the Talbot envelope is now more dominant in the overall fringe visibility.

FIGS. 1 to 4 and 6 have illustrated transmissive scales 10, but it is often more convenient to use a reflective scale. FIG. 5 illustrates an embodiment of the invention with a reflective scale 10, an index grating 12, an analyser grating 14, a light source 18 and a collimating lens 24. Apart from the reflective scale, each of these components may be as discussed above in relation to FIGS. 1 to 4 and 6.

For best results, the scale 10 should be specularly reflective, at least partially. A scale which at least partially diffuses light from the source will act to increase the effective source size and therefore will reduce the range of the geometric visibility envelope. A specular scale, whether transmissive or reflective, will maximise the range of the geometric visibility envelope.

The light source 18 and lens 24 in FIG. 5 may be arranged to illuminate the scale from one side, and the gratings 12,14 are then offset correspondingly to the other side of the scale. Alternatively, the light source 18 and lens 24 may be arranged directly above the scale 10, longitudinally spaced from the gratings 12,14, in order to illuminate the scale end-on. If desired, the light source 18 may be square or circular, with the required size $\Delta xs$. The lens 24 may then be a rotationally symmetrical convex lens. However, as illustrated, the source 18 may be elongate in the direction transverse to the scale 10, and the lens 24 may be a cylindrical lens arranged to collimate the light from the source 18 only in the longitudinal direction of the scale.

The width $\Delta xs$ of the source 18, in the longitudinal direction of the scale, is chosen in accordance with relation (5), for the same reasons as in FIG. 4; or in accordance with relations (17) to (19).

What is claimed is:

1. Opto-electronic scale reading apparatus, comprising:
    a light source having a finite size;
    an elongate, periodic scale which is illuminated by the light source;
    an index grating, spaced from the scale and which receives light from the scale and interacts therewith to form fringes in a Talbot plane, the location of said Talbot plane varying with the spacing between the index grating and the scale, each fringe extending for a distance away from said Talbot plane;
    the scale and the index grating being movable relative to each other in the direction of the length of the scale;
    an analyser, located nominally in said Talbot plane, which interacts with said fringes to analyse the relative movement between the scale and the index grating;
    wherein the visibility of said fringes at the analyser varies as the location of said Talbot plane varies relative to the analyser; said visibility depending both upon a Talbot fringe visibility envelope, and upon a geometric fringe visibility envelope which depends upon the size of the light source; and
    wherein the size of said light source is smaller than a predetermined value such that the extent of the geometric fringe visibility envelope exceeds the extent of the Talbot fringe visibility envelope.

2. Opto-electronic scale reading apparatus according to claim 1, wherein the extent of the geometric fringe visibility envelope is greater than one and a quarter times the extent of the Talbot fringe visibility envelope.

3. Opto-electronic scale reading apparatus according to claim 1, wherein the extent of the geometric fringe visibility envelope is less than four times the extent of the Talbot fringe visibility envelope.

4. Opto-electronic scale reading apparatus according to claim 3, wherein the extent of the geometric fringe visibility envelope is less than three times the extent of the Talbot fringe visibility envelope.

5. Opto-electronic scale reading apparatus according to claim 4, wherein the extent of the geometric fringe visibility envelope is less than twice the extent of the Talbot fringe visibility envelope.

6. Opto-electronic scale reading apparatus according claim 1, wherein the extents of said envelopes are determined by their full width half maximum values.

7. Opto-electronic scale reading apparatus according claim 1, including a collimating lens between the light source and the scale.

8. Opto-electronic scale reading apparatus according to claim 2, wherein the extent of the geometric fringe visibility envelope is less than four times the extent of the Talbot fringe visibility envelope.

9. Opto-electronic scale reading apparatus according to claim 2, wherein the extent of said envelopes are determined by their full width half maximum values.

10. Opto-electronic scale reading apparatus according to claim 3, wherein the extents of said envelopes are determined by their full width half maximum values.

11. Opto-electronic scale reading apparatus according to claim 4, wherein the extent of said envelopes determined by their full width half maximum values.

12. Opto-electronic scale reading apparatus according to claim 5, wherein the extents of said envelopes are determined by their full width half maximum values.

13. Opto-electronic scale reading apparatus according to claim 2, including a collimating lens between the light source and the scale.

14. Opto-electronic scale reading apparatus according to claim 3, including a collimating lens between the light source and the scale.

15. Opto-electronic scale reading apparatus according to claim 4, including a collimating lens between the light source and the scale.

16. Opto-electronic scale reading apparatus according to claim 5, including a collimating lens between the light source and the scale.

17. Opto-electronic scale reading apparatus according to claim 6, including a collimating lens between the light source and the scale.

* * * * *